United States Patent [19]

Kurihara et al.

[11] Patent Number: 5,053,970

[45] Date of Patent: Oct. 1, 1991

[54] WORK SCHEDULING METHOD

[75] Inventors: Kenzo Kurihara, Tokyo; Kichizo Akashi, Ebina; Keiichi Hara, Kawasaki; Noriko Komori, Owariasahi, all of Japan

[73] Assignees: Hitachi, Ltd.; Hitachi Microcomputer Engineering Ltd., Tokyo, Japan

[21] Appl. No.: 244,740

[22] Filed: Sep. 15, 1988

[30] Foreign Application Priority Data

Sep. 18, 1987 [JP] Japan ................................ 62-234530

[51] Int. Cl.[5] ............................................ G06F 15/46

[52] U.S. Cl. .................................... 364/468; 364/401; 364/513

[58] Field of Search ............... 364/513, 468, 401, 402, 364/403, 149–151, 300, 200 MS File, 900 MS File

[56] References Cited

U.S. PATENT DOCUMENTS 4,628,435 12/1986 Tashiro et al. .................. 364/468 X
4,796,194 1/1989 Atherton ......................... 364/300 X
4,852,001 7/1989 Tsushima et al. .............. 364/468 X

OTHER PUBLICATIONS

Saji, et al., "Operation Research; 6–4 Assignment Problem", pp. 225–229.

S. Tamano, et al., "Print Circuit Board Design Aiding Expert System", preprint for 33rd meeting of the Information Processing Society of Japan, 1968 (Latter Half), pp. 1165–2266.

*Primary Examiner*—Joseph Ruggiero
*Attorney, Agent, or Firm*—Fay, Sharpe, Beall, Fagan, Minnich & McKee

[57] ABSTRACT

In a scheduling system, constraints changing based on situations and scheduling know-how are implemented according to the knowledge engineering method, whereas computations for the concrete, optimal allocation are conducted according to the mathematical programming method. As a result, there can be achieved a scheduling which can easily cope with changes in the scheduling know-how and constraints and which has a high maintainability and a high computation speed.

4 Claims, 8 Drawing Sheets

F I G. 2
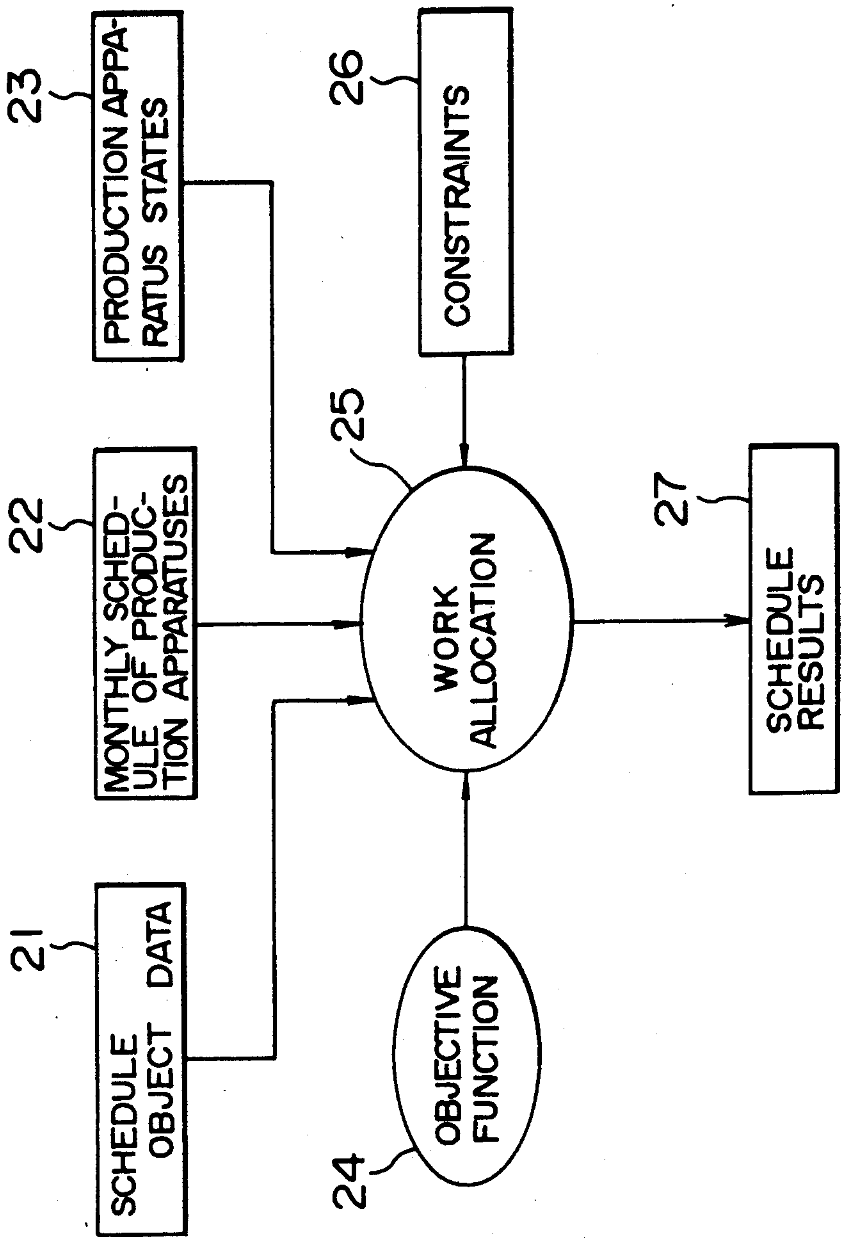

| APPARATUS NAME | MAINTAINABLE PERIOD | | |
|---|---|---|---|
| | REQUIRED DAYS | START | END |
| A | 1 | 1 | 5 |
| B | 2 | 20 | 27 |
| ⋮ | ⋮ | ⋮ | ⋮ |

FIG. 6A

| APPARATUS NAME | ALLOCATABLE WORK | | |
|---|---|---|---|
| | 1 | 2 | ... |
| A | 401 | 402 | ... |
| B | 401 | 403 | ... |
| ⋮ | | | |

FIG. 6B

| WORK NAME | WORK TIME | |
|---|---|---|
| | START DAY | END DAY |
| 401 | 1 | 5 |
| 402 | 2 | 6 |
| ⋮ | | |

FIG. 7

| APPARATUS \ WORK | 401 | 402 | 403 | 404 | ... |
|---|---|---|---|---|---|
| A | 0 | 10 | 7 | – | |
| B | 10 | – | 7 | 5 | |
| ⋮ | | | | | |
| | | | | | |
| | | | | | |

| WORK NAME | WORK PERIOD | | APPARATUS NAME |
|---|---|---|---|
| | START DAY | END DAY | |
| MAINTENANCE | 1 | 1 | A |
| 401 | 1 | 5 | B |
| 402 | 2 | 6 | A |

| APPA-RATUS | WORK AND MAINTENANCE | | | | | | EVALUA-TION POINT |
|---|---|---|---|---|---|---|---|
| | DATE | 1 | 2 | 3 | 4 | 5 ··· | |
| A | 401 | | | | | | 0 |
| | 402 | | | | | | 10 |
| | 403 | | | | | | 7 |
| B | 401 | | | | | | 10 |
| | 403 | | | | | | 7 |
| | 404 | | | | | | 5 |

WORK SCHEDULING METHOD

BACKGROUND OF THE INVENTION

The present invention relates to a computer system for solving various scheduling problems, for example, a work scheduling system, and in particular, to a scheduling system suitably applicable to a case where constraints for the scheduling are frequently changed.

Heretofore, there have been developed various kinds of scheduling systems, and the scheduling methods employed therein can be classified into the following two kinds.

In the first scheduling method, a scheduling problem represented in a mathematical formulation is inputed to a computer system, which then solves the scheduling problem according to a mathematical programming method like that described, for example, in N. Saji et al., "OPERATIONS RESEARCH; 6-4 assignment problem", July 1963, pp. 225-229 and S. Tamano et al., "PRINT CIRCUIT BOARD DESIGN AIDING EXPERT SYSTEM", preprint for 33rd meeting of the Information Processing Society of Japan; 1986 (latter half), pp. 1165-1166.

On the other hand, in the second scheduling method, all know-how information items associated with the scheduling are entirely programmed so as to effect the scheduling through a computer simulation.

If all constraints for the scheduling can be determined in advance so as to clearly formulate the scheduling problem, it is possible to achieve the scheduling according to the conventional scheduling method. As described herebelow, however, in actual, the constraints for the scheduling cannot be easily determined in advance; furthermore, the problem itself changes in association with the circumferential environment. Consequently, few systems adopting the conventional method have been put to the practical use.

A. Difficulties associated with prior decision of scheduling constraints

In many cases, all schedule constraints cannot be determined prior to the scheduling, for example, in a scheduling of a production process, the scheduling is desirably required to be effected to reserve the maintenance time of an equipment to the possible extent; however, because of the production quantity and the relationship with respect to the maintenance time of other equipment, the actual scheduling is often to be achieved by changing a portion of the maintenance time of the equipment.

B. Change of problem itself in association with circumferential environment

The schedule problem varies due to changes in the environment; in consequence, the scheduling algorithm is also required to follow the change. In the conventional scheduling method, however, since the scheduling algorithm is coded in a program, it is practically impossible to arbitrarily modify the algorithm.

In order to solve the problems above, there has been proposed a system using a knowledge engineering technique in which know-how information items and constraints related to the scheduling are configured in a knowledge base so as to cope with the changes in the constraints, thereby solving the scheduling problem through a computer simulation. As an example of this system, there has been known, for example, the Printed Board Design Process Control Aid Expert System described in pages 1165 to 1166 of the Proceeding of 33rd National Conference of Information Processing Society of Japan. However, also in the system above, since the allocation is sequentially achieved by respectively paying attention to the maintenance jobs and the like associated with a work and an apparatus, the obtained schedule is not always satisfactorily balanced as a whole.

In addition, there have been beforehand determined the periods of time for the maintenance of a production apparatus and the like, it is difficult to decide the allocation of a point of time when the actual job is to be effected in such a period. To overcome the difficulty, according to the conventional method, the point of time when the maintenance job is to be conducted is determined through the trial and error. In such a situation, a considerably great period of time is required for the scheduling and the results of the scheduling is not necessarily satisfactory for the user.

SUMMARY OF THE INVENTION

It is therefore an object of the present invention to solve the various problems in the conventional work scheduling system so as to provide a scheduling system having a high maintainability which is capable of easily coping with a change in scheduling know-how information items and constraints and which has a high computation speed.

The object above can be achieved by a scheduling system including a combination use of a knowledge engineering approach and a mathematical programming approach. That is, the object can be achieved by a work scheduling system associated with the work scheduling of a production process and the like which includes means for describing and for utilizing scheduling constraints and scheduling know-how information items respectively to undergo frequent changes according to a knowledge engineering method, means for implementing a concrete and optimal allocation and processing portions such as various computations to be less frequently changed and to be processed in a relatively long time, and means for utilizing these means above in combination.

Operations to be described according to the knowledge engineering method include 1: Analysis of the states of the scheduling effected and decision of scheduling algorithms to be employed at the respective points of time and 2: Decision of parameter values indicating execution conditions for the selected scheduling algorithms. These items are represented by use of so-called production rules. On the other hand, items to be described according to the mathematical programming method includes the various scheduling algorithms.

As described above, it is difficult to solve a scheduling problem only by use of the mathematical programming method. As a method of solving such a problem, there is considered a knowledge engineering approach, which is also effective in a case where the formulation of the object problem is attended with a difficulty as described below.

For example, it can be considered that the scheduling know-how of experts of a scheduling problem is described according to the knowledge engineering method in a form associated with IF (condition) and THEN (result) so as to configure a knowledge base, thereby achieving the scheduling by use of the knowledge and an inference engine of a syllogism type. This approach is advantageous in that the system configuration is sim l. and that the maintainability of the scheduling system is considerably improved as compared with a scheduling system described in the conventional procedural language. On the other hand, according to this approach, there exist disadvantages that a relatively long time is required for the processing and that a satisfactory solution cannot be always attained when characteristics of the object data are changed. In consequence, it can be considered that the range of the combinatorial computation like that associated with the scheduling problem is limited when the computation is implemented only by use of the knowledge engineering approach.

According to the present invention, consequently, the knowledge engineering approach is applied only to 1: Processing to analyze the states of the scheduling effected so as to determine scheduling algorithms suitable for the respective points of time and 2: Processing to determine scheduling conditions such as parameter values indicating execute conditions to execute the respective scheduling algorithms, thereby sustaining the maintainability to easily cope with changes in the scheduling know-how and constraints. On the other hand, the mathematical programming method is employed to implement the concrete and optimal allocation and portions of various computations which are to be less frequently changed and which take a relatively long time for the processing thereof, thereby decreasing the processing time.

As described above, these features that the logic characteristic to an object is separated from the mathematical computation logic and that the processing time is decreased also lead to an advantage that the scheduler is enabled to take the initiative for the achievement of a computer aided planning. This is quite important when a computer system is to be constructed for a scheduling problem which cannot be completely automatically effected in a computer.

BRIEF DESCRIPTION OF THE DRAWINGS

The present invention will become more apparent from the following detailed description taken in conjunction with the accompanying drawings in which:

FIG. 2 is an explanatory diagram useful to explain a scheduling problem;

FIG. 5 is a schematic diagram showing an example of a maintenance period table for a production apparatus;

FIG. 6A is a diagram showing an example of an allocatable apparatus table;

FIG. 6B is a diagram showing an example of an allocatable work table;

FIG. 7 is a schematic diagram showing priority levels of works to be allocated;

FIG. 9 is a schematic diagram showing an example of a schedule table; and

DESCRIPTION OF THE PREFERRED EMBODIMENTS

Figure 1:
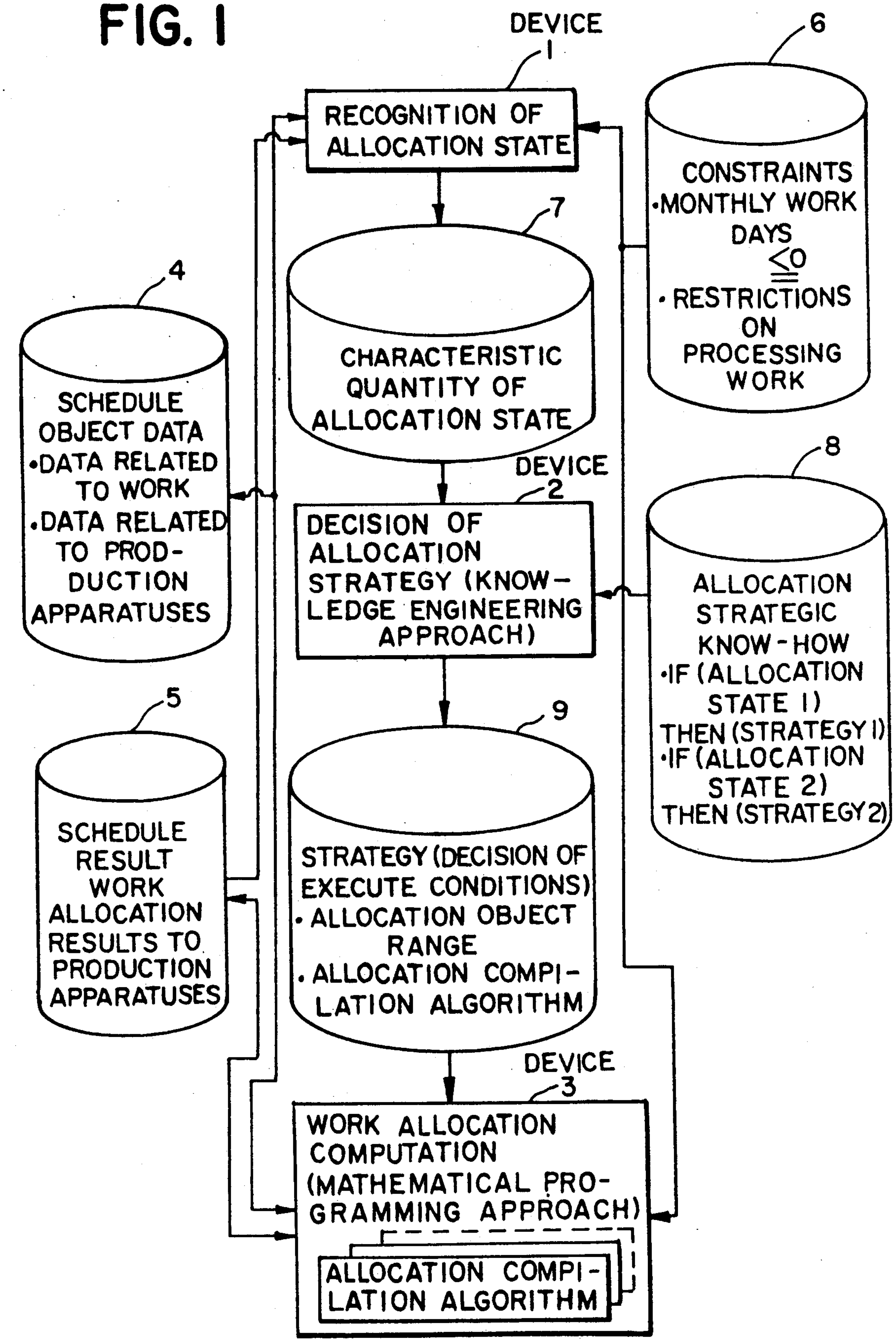
FIG. 1 is a functional configuration diagram schematically showing a work scheduling system as an embodiment according to the present invention.

Description will be given of embodiments in which the present invention is applied to a work scheduling associated with a production process.

A work scheduling problem is determined by defining given data, constraints, objective functions, and determinating variables as follows, for example, as shown in FIG. 2.

(1) Given data: 21 to 23

21: Schedule object data (group of works to be processed (per month))

22: Monthly schedule for production apparatuses (holidays, etc.)

23: Allocation states for production apparatuses (portions of schedule of this month determined according to the schedule of the previous month)

(2) Constraints: 26

Constraints imposed on the work allocation to production apparatus

The constraints includes those to be observed (hard constraints) and those desirably to be observed (soft constraints). Note that these constraints cannot be expressedly stipulated in the text and are to be changed for various reasons.

a) Hard constraints: Maintenance jobs, work processing jobs, etc.

b) Soft constraints: Upper limit of operation time of each production apparatus, etc.

(3) Objective function: 24

Standardization of operation time on production apparatus (4) Determinating variable (schedule result): 27

Monthly work schedule for each production apparatus

As described above, the work allocation problem for production apparatuses differs from that of the linear programming method in two points as follows. Namely, 1: A plurality of works are required to be allocated to a production apparatus and 2: A dependence relationship exists between works. In short, the degree of convenience of the work allocation to a production apparatus depends on the prior work allocation to the production apparatus. Consequently, the work allocation problem cannot be solved only by simply using the linear programming method.

According to the present invention, in order to allocate at most one work to a production apparatus an allocation period is subdivided into several subperiods such that the work allocation is accomplished according to the mathematical programming method for each subperiod. However, since the problem is solved by subdividing the allocation period into subperiods, the dependence relationships between works cannot be completely taken into consideration. As a result, there exists a disadvantage that a solution which is inherently existing for the problem cannot be obtained in some cases. To overcome this difficulty, according to the present invention, the knowledge engineering method is employed as follows.

That is, after a work allocation is effected to a subperiod, subsequent subperiods are checked to find out any subperiods for which the work allocation is considered to be difficult such that the portion associated therewith is extracted as a difficult partial problem to be solved. The extraction of the difficult partial problem and selection of a solution thereof (to be referred to as an allocation strategy herebelow) are the know-how possessed by experts of the scheduling problem, and the allocation strategy is implemented by use of the knowledge engineering method. By repeatedly effecting the extraction of a difficult partial problem, the determination of a solution thereof, and the work allocation to the subperiod as described above, the monthly work schedule is produced for all production apparatuses. Next, description will be given in detail of the method to attain the subperiod and the extraction of a difficult partial problem and the determination of a solution thereof.

FIG. 1 shows a functional configuration example of a work scheduling system according to the present invention. The basic constitution of this system includes a device 1 for recognizing an allocation state, a device 2 for scheduling an allocation strategy according to the knowledge engineering method, and a device 3 for solving a partial problem according to the mathematical programming method.

The device 1 extracts a characteristic quantity based on information obtained from a file 4 storing schedule object data, a file 5 storing intermediate results of a schedule, and a file 6 storing constraints and then stores the characteristic quantity of the allocation state in a file 7. The device 2 determines a strategy for the allocation based on the characteristic quantity of the allocation state stored in the file 7 and information attained from a file 8 containing allocation strategy know-how and then stores the allocation strategy in a file 9. The device 3 conducts a computation for a work allocation based on the allocation strategy read from the file 9 and then stores a result of the work allocate computation in the file 5.

Incidentally, the experts can find, based on experiences, a portion corresponding to a difficult partial problem. Such knowledge accumulated through the experiences is represented as strategy rules to be stored in the file 8. Utilizing the strategy rules thus stored, the device 2 automatically extracts the difficult partial problem and determines an allocation strategy thereof according to the knowledge engineering method. The device 3 then obtains a solution of a partial problem including the allocation of a difficult portion and an allocation of a subperiod according to the mathematical programming method.

As a concrete allocation strategy, let us consider the following knowledge items, which are associated with the know-how and are required to be altered at any point of time.

(1) Strategy associated with works a) Extraction of partial problem based on the number of candidate production apparatuses The allocation is sequentially achieved in a work-by-work fashion beginning from a work related to the smaller number of candidate production apparatuses.

b) Extraction of partial problem based on the number of days necessary for processing the work The allocation is sequentially achieved in a work-by-work fashion beginning from a work related to the greater number of days necessary for processing the work.

(2) Strategy associated with periods a) Extraction of partial problem based on the magnitude of load The allocation is sequentially achieved in a work-by-work fashion beginning from a work related to the greater magnitude of load.

In a case where none of the strategies is applicable, the work allocation is accomplished in the order of the month and the day. In this operation, a period (a subperiod described above) is extracted so as to satisfy the constraint that one work is allocated to a production apparatus and then the allocation is effected in this range. The method to attain a subperiod will be described later.

Figure 3:
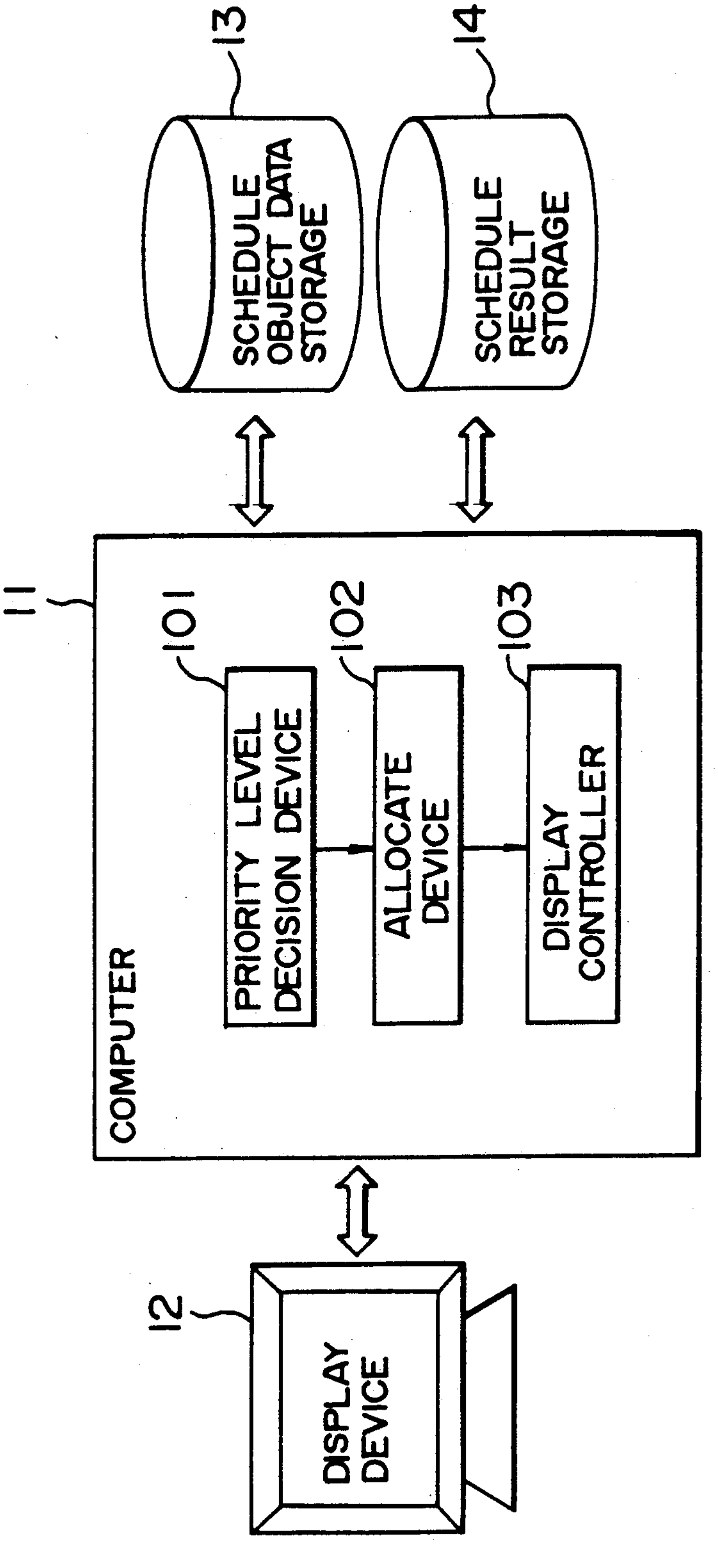
FIG. 3 is a schematic diagram showing an internal configuration of an apparatus for solving a partial problem according to a mathematical programming method.

FIG. 3 shows an internal configuration example of the device 1 of FIG. 1. In this configuration, a computer 11 controlling this system includes a work priority level decision device 101, a device 102 for allocating works and maintenance etc. to production apparatuses, and a display controller 103 for displaying schedule results. Incidentally, in order to display the schedule results, the display device 12 is provided with input devices such as a keyboard, a mouse, and a track board. In addition, the storage 13 is disposed to store schedule object data such as data concerning works and maintenance periods of production apparatuses, whereas the storage 14 is used to store schedule results.

Figure 4:
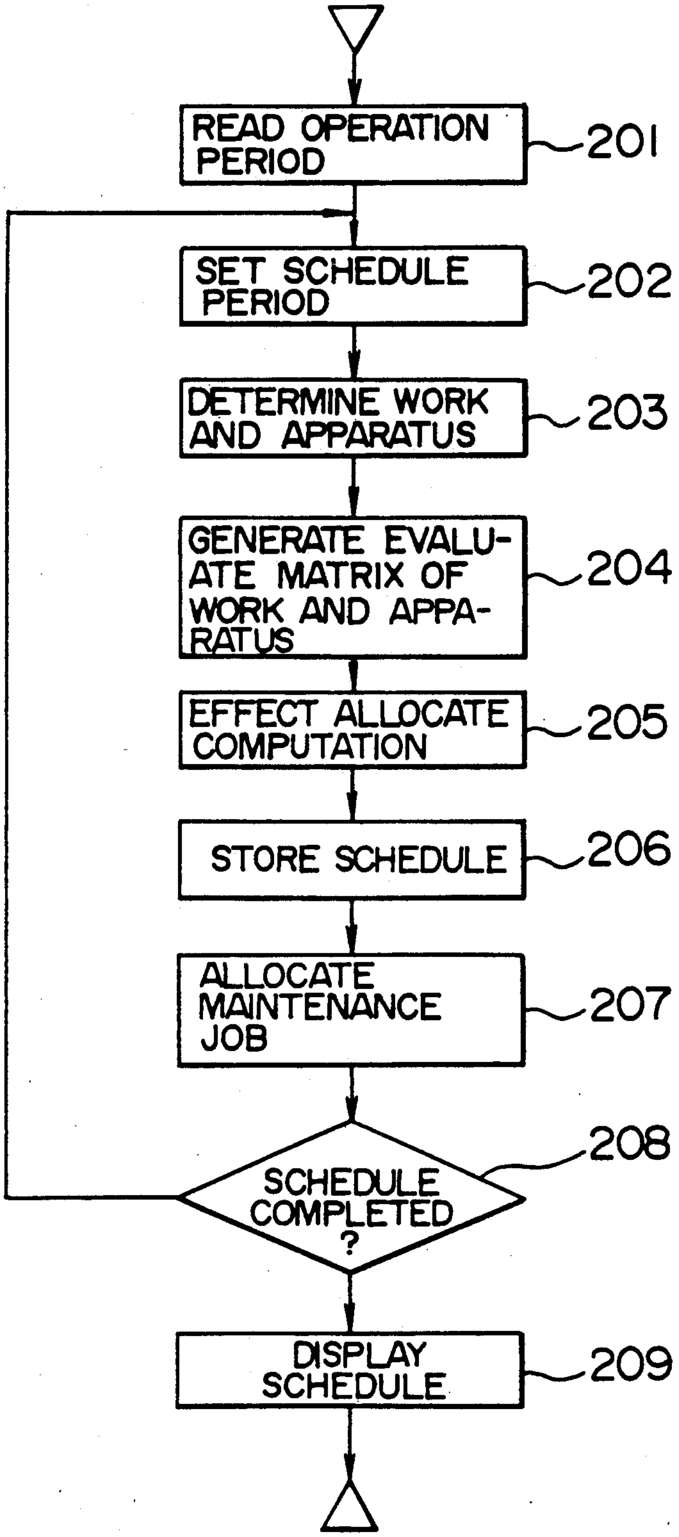
FIG. 4 is a flowchart showing respective operation procedures of a work priority level decision unit, an allocation unit, and a display controller in a computer 11 employed in the embodiment of FIG. 3.

FIG. 4 is a flowchart showing operation procedures of the work priority level decision device 101 (executing steps 201 to 203 of FIG. 4), the allocate device 102 (executing steps 204 to 207), and the display controller 103 (executing steps 208 and 209).

Referring now to FIGS. 1 to 4, description will be given of the operation of the embodiment.

Step 201: The system retrieves a device name 301 and a maintenance operation enable period 302 of the pertinent apparatus from a maintenance period table (FIG. 5) of production apparatuses stored in the storage 13 and then passes control to the next step.

Step 202: The system determines as a period (the subperiod described above) for generating a schedule, for example, "a period in which there is established a one-to-one correspondence between the apparatuses and works" and then proceeds to the next step.

Step 203: The system retrieves apparatuses allocatable in the subperiod determined by the previous step and works to be allocated so as to respectively store these items in an allocatable apparatus table of FIG. 6A and an allocation work table of FIG. 6B, and then control is transferred to the next step.

Figure 8:
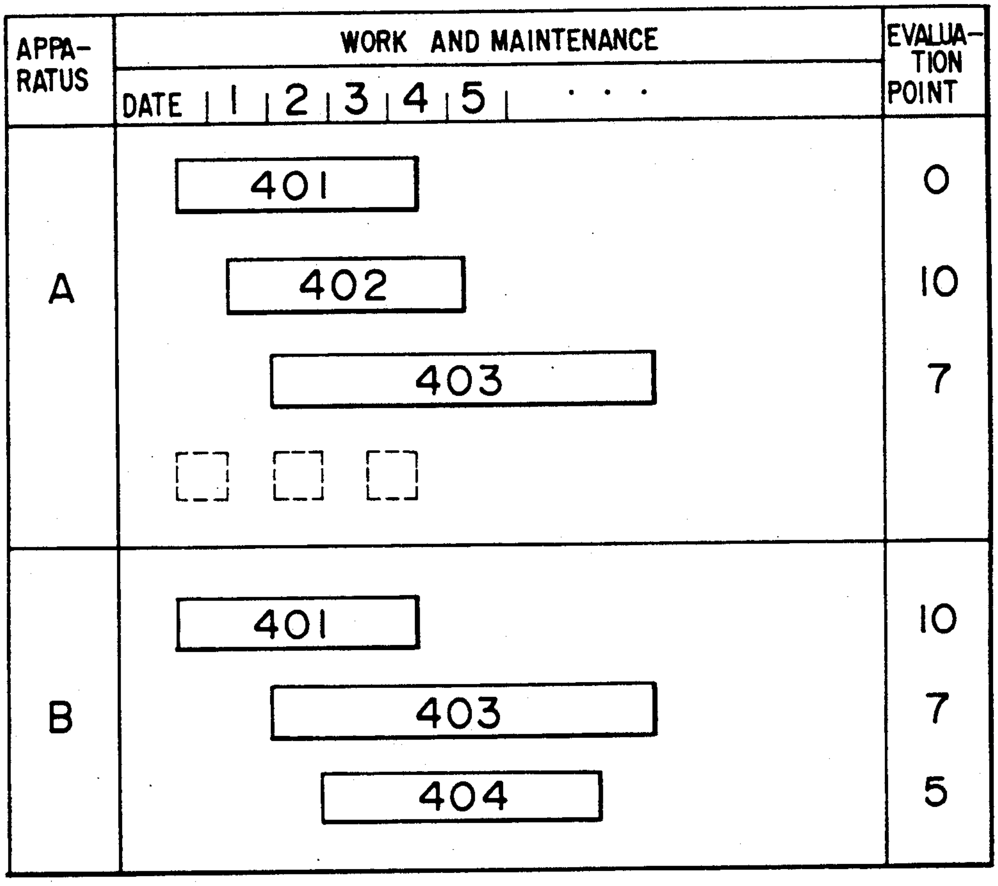
FIG. 8 is a diagram showing an example of the operation to determine the priority levels of works to be allocated.

Step 204: For all combinations of the apparatuses and works obtained in the preceding step, the system evaluates in a comprehensive fashion how the works should be assigned to the apparatuses, thereby creating a matrix of FIG. 7. For example, for an apparatus requiring the maintenance, like an apparatus A of FIG. 8, the processing is effected to determine the evaluation points as follows.

1. Work 401: The maintainable period of the apparatus is entirely unused and hence the maintenance cannot be assigned: Evaluation point=0.

2. Work 402: Although the maintainable period of the apparatus is partially unused, the maintenance can be efficiently assigned without any loss of time: Evaluation point=10.

3. Work 402: Although the maintainable period of the apparatus is partially unused, the maintenance can be assigned. However, there appears a free da[illegible] which the maintenance is not allocated to the apparatus: Evaluation point=7.

In addition, for an apparatus not requiring the maintenance, like an apparatus B, the evaluation takes place to determine the priority levels as follows.

a. Work 401: The maintenance period of the apparatus is entirely allocated: Evaluation point=10.

b. Work 403: Although a free time appears, the work allocation is effected: Evaluation point=7.

c. Work 404: The greater number of free days appear as compared with the case of the allocation of the work 403, the work allocation is achieved: Evaluation point=5.

Step 205: Based on the matrix created in the previous step, the system attempts to solve an N X N optimal combination problem of the mathematical programming method, namely, to determine one of the combinations of the matrix so as to attain the maximum of the sum of the respective element of the matrix. The attained solution is assumed to be an optimal allocation, thereby creating a schedule.

Step 206: The system loads a schedule table of FIG. 9 with the work schedule results created in the preceding step as a work name 701, a work period 702, and an allocation apparatus name 703.

Step 207: The system checks the schedule table of FIG. 9. If the maintenance work retrieved in the step 201 is allocatable, the system allocates the maintenance work to the apparatus and proceeds to the next step.

Step 208: The system judges to determine whether or not the schedule creation has been completed. If this is not the case, control is returned to the step 202. If the schedule has been completely generated, the processing proceeds to step 209.

Step 209: The system displays the schedule result on the display device 12 and completes the processing.

Figure 10:
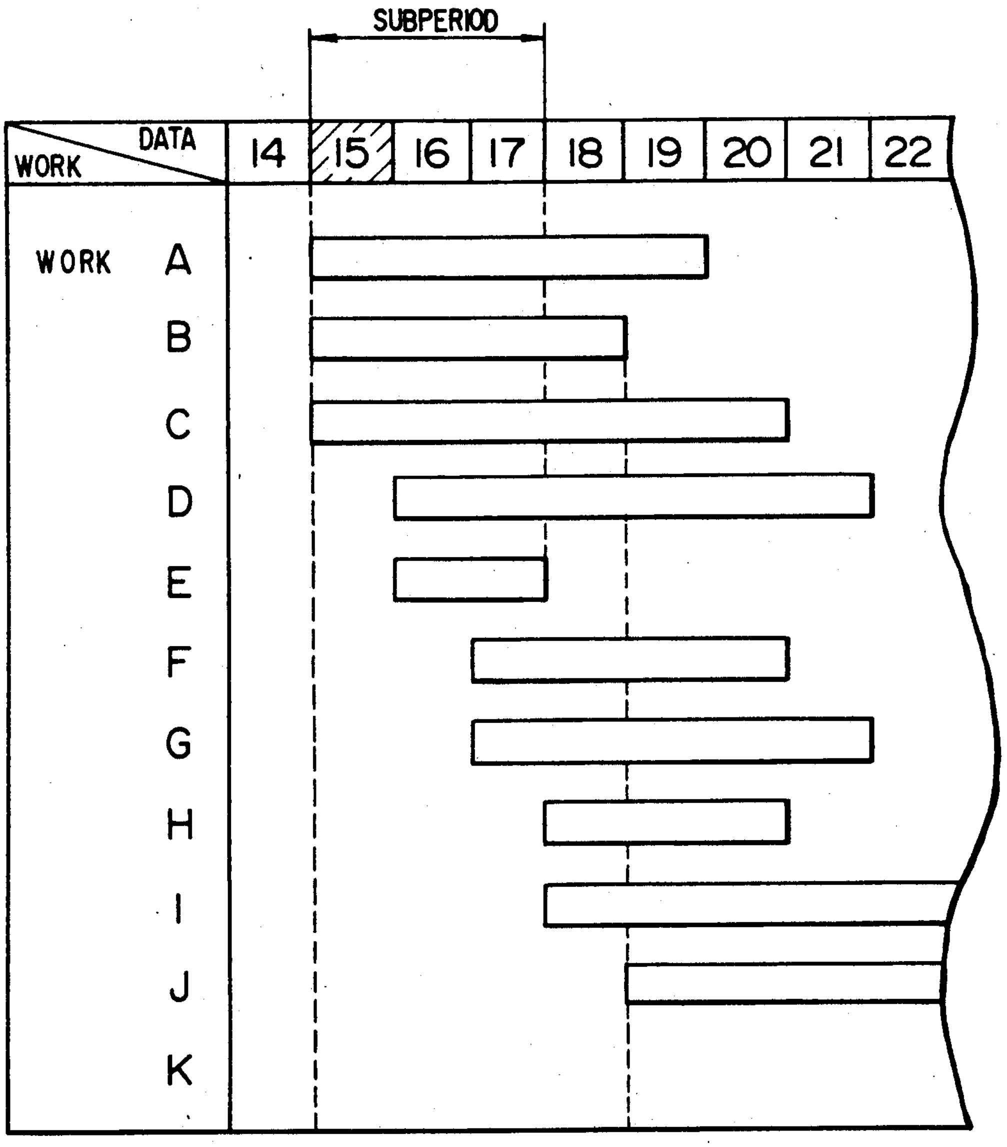
FIG. 10 is an explanatory diagram useful to explain a method of computing the allocation period of time.

Incidentally, in the processing above, a sub-period in which at most one work is allocated to a production apparatus can be obtained as follows. Assume here that the 15th day of the month is considered as a center of the operation as shown in FIG. 10. Under this situation, let us determine the end limit of the initiation date of works for which the constraint of the one-to-one correspondence between the apparatuses and works is satisfied. First, of the works to be initiated on the 15th, the work B has the shortest period of time, namely, four days. In consequence, for a production apparatus which has started the work to be initiated on the 15th, the works to be commenced by the 18th cannot be allocated. Next, of the works to be initiated in the period of time ranging from the 15th to the 18th, let us find out a work to be first terminated, namely, a work having the earliest termination date. Work E is obtained as a result and this work terminates on the 17th, which indicates that a production apparatus having started the work E may possibly initiate processing of a work to be commenced on the 18th. Through the considerations above, it is found that among the works to be initiated in the period of time ranging from the 15th to the 17th, the one-to-one correspondence between the apparatuses and the works is satisfied.

In the description of the embodiment above, although the present invention is applied to a work scheduling problem in a production process, the present invention is not restricted by this embodiment and is also effectively applicable, for example, to an operation to produce a flight schedule for pilots to undergo the training on the ground at a fixed interval.

As described in detail above, according to the present invention, in various scheduling systems for producing schedules such as a work schedule of a production process, there is attained an advantageous effect to implement a scheduling system having a high computation speed which can easily cope with changes in the scheduling know-how and constraints and which has hence a high maintainability.

We claim:

1. A scheduling method for making a work schedule for allocating a plurality of work to a plurality of resources in a system including a CPU and a first and second memory means, comprising the steps of:

first representing scheduling constraints and scheduling know-how in a form of knowledge representation by knowledge engineering to make said work schedule and storing said knowledge representation in said first memory means, second representing a part of optimal allocation in a plurality of programs built-in by mathematical programming and storing said plurality of programs in said second memory means, determining at least one program from said plurality of programs by use of said knowledge representation stored in said first memory means, and repeating said determining step to obtain said work schedule.

2. The scheduling method for making a work schedule according to claim 1, said step of second representing a part of optimal allocation in a plurality of programs built-in with the mathematical programming includes steps of:

analyzing status of allocation representing proceedings of schedules, and determining, in response to the result of said analyzing step, both a program to be used for allocation and a parameter indicating status of execution of said program.

3. The scheduling method for making a work schedule according to claim 1, said step of representing said scheduling constraints and said scheduling know-how in a form of said knowledge representation including the step of:

describing various kinds of allocation programs.

4. The scheduling method for making a work schedule according to claim 1, further comprising the step of:

allocating maintenance jobs for each of said resources in parallel with a process for said allocation.

* * * * *